(12) United States Patent
Filseth et al.

(10) Patent No.: US 8,411,853 B2
(45) Date of Patent: Apr. 2, 2013

(54) ALTERNATE GALOIS FIELD ADVANCED ENCRYPTION STANDARD ROUND

(75) Inventors: Paul G. Filseth, Los Gatos, CA (US); Mikhail Grinchuk, San Jose, CA (US); Anatoli Bolotov, Cupertino, CA (US); Lav D. Ivanovic, Sunnyvale, CA (US)

(73) Assignee: LSI Corporation, San Jose, CA (US)

( * ) Notice: Subject to any disclaimer, the term of this patent is extended or adjusted under 35 U.S.C. 154(b) by 1252 days.

(21) Appl. No.: 12/200,037

(22) Filed: Aug. 28, 2008

(65) Prior Publication Data
US 2010/0057823 A1 Mar. 4, 2010

(51) Int. Cl.
*H04L 9/00* (2006.01)
(52) U.S. Cl. ............... 380/29; 380/28; 380/44; 708/492
(58) Field of Classification Search .................... 380/28, 380/29, 44; 708/492
See application file for complete search history.

(56) References Cited

U.S. PATENT DOCUMENTS

| | | | | |
|---|---|---|---|---|
| 7,860,240 | B2 * | 12/2010 | Mathew et al. ................. | 380/28 |
| 2004/0202317 | A1 * | 10/2004 | Demjanenko et al. .......... | 380/28 |
| 2005/0058285 | A1 * | 3/2005 | Stein et al. ...................... | 380/29 |

OTHER PUBLICATIONS

Zhang, Zinmiao and Parhi, Keshab K., "High-Speed VLSI Architectures for the AES Algorithm", IEEE Transactions on Very Large Scale Integration (VLSI) Systems, vol. 12, No. 9, Sep. 2004, pp. 957-967.

"Announcing the Advanced Encryption Standard (AES)", Federal Information Processing Standards Publication 197, Nov. 26, 2001, 47 pages.

* cited by examiner

*Primary Examiner* — Jeffrey Pwu
*Assistant Examiner* — Helai Salehi
(74) *Attorney, Agent, or Firm* — Christopher P. Maiorana, PC

(57) ABSTRACT

An apparatus having a first circuit and a second circuit is disclosed. The first circuit may be configured to (i) generate second Galois Field elements by performing a first Galois Field inversion on first Galois Field elements, the first Galois Field inversion being different from a second Galois Field inversion defined by an Advanced Encryption Standard and (ii) generate third Galois Field elements by multiplying the second Galois Field elements by an inverse of a predetermined matrix. The second circuit may be configured to (i) generate fourth Galois Field elements by processing the third Galois Field elements in a current encryption round while in a non-skip mode, (ii) generate fifth Galois Field elements by multiplying the fourth Galois Field elements by the predetermined matrix and (iii) present the fifth Galois Field elements as updated versions of the first Galois Field elements in advance of a next encryption round.

20 Claims, 8 Drawing Sheets

$$A = \begin{bmatrix} 10001111 \\ 11000111 \\ 11100011 \\ 11110001 \\ 11111000 \\ 01111100 \\ 00111110 \\ 00011111 \end{bmatrix} \quad H0 = \begin{bmatrix} 10000000 \\ 01000000 \\ 00100000 \\ 00010000 \\ 00001000 \\ 00000100 \\ 00000010 \\ 00000001 \end{bmatrix} \quad G0 = \begin{bmatrix} 10010000 \\ 11001000 \\ 11100100 \\ 01110010 \\ 10101001 \\ 11000100 \\ 01100010 \\ 00100001 \end{bmatrix}$$

$$M = \begin{bmatrix} 02\ 03\ 01\ 01 \\ 01\ 02\ 03\ 01 \\ 01\ 01\ 02\ 03 \\ 03\ 01\ 01\ 02 \end{bmatrix} \quad H1 = \begin{bmatrix} 01000000 \\ 00100000 \\ 00010000 \\ 10001000 \\ 10000100 \\ 00000010 \\ 10000001 \\ 10000000 \end{bmatrix} \quad G1 = \begin{bmatrix} 11010000 \\ 11101000 \\ 11110100 \\ 11111010 \\ 00101101 \\ 11000110 \\ 11100011 \\ 10100001 \end{bmatrix}$$

$$D = \begin{bmatrix} 11000010 \\ 01001010 \\ 01111001 \\ 01100011 \\ 01110101 \\ 00110101 \\ 01111011 \\ 00000101 \end{bmatrix} \quad H2 = \begin{bmatrix} 11000000 \\ 01100000 \\ 00110000 \\ 10011000 \\ 10001100 \\ 00000110 \\ 10000011 \\ 10000001 \end{bmatrix} \quad G2 = \begin{bmatrix} 10110000 \\ 11011000 \\ 01101100 \\ 10110110 \\ 11101011 \\ 01000101 \\ 10100010 \\ 01100001 \end{bmatrix}$$

$$G3 = \begin{bmatrix} 01110000 \\ 10111000 \\ 01011100 \\ 00101110 \\ 01100111 \\ 01000011 \\ 00100001 \\ 11100000 \end{bmatrix}$$

<u>FIG. 1</u>

TABLE I

|    | 0  | 1  | 2  | 3  | 4  | 5  | 6  | 7  | 8  | 9  | a  | b  | c  | d  | e  | f  |
|----|----|----|----|----|----|----|----|----|----|----|----|----|----|----|----|----|
| 00 | 00 | 01 | 03 | 02 | 0f | 0c | 09 | 0b | 0a | 06 | 08 | 07 | 05 | 0e | 0d | 04 |
| 10 | 55 | 50 | e9 | e7 | d4 | d9 | 4a | 4e | 61 | 67 | a4 | ae | 72 | 75 | 82 | 8a |
| 20 | ff | 9e | f0 | 97 | e1 | 45 | ef | 41 | bc | c9 | b7 | c5 | d3 | 59 | de | 5c |
| 30 | aa | 7e | 79 | a0 | b2 | f8 | f7 | b9 | 93 | c3 | cf | 9a | 68 | 8f | 87 | 6e |
| 40 | ee | 27 | cd | 71 | e0 | 25 | c1 | 76 | 6d | be | 16 | 4f | 6b | b5 | 17 | 4b |
| 50 | 11 | 54 | 7d | 9c | 51 | 10 | 95 | 7a | d2 | 2d | fa | 64 | 2f | df | 62 | f5 |
| 60 | 66 | 18 | 5e | f4 | 5b | fb | 60 | 19 | 3c | 8e | b4 | 4c | bf | 48 | 3f | 86 |
| 70 | cc | 43 | 1c | 74 | 73 | 1d | 47 | c0 | a1 | 32 | 57 | 94 | 9d | 52 | 31 | ab |
| 80 | 99 | e3 | 1e | 8b | d6 | c6 | 6f | 3e | 90 | ed | 1f | 83 | db | ca | 69 | 3d |
| 90 | 88 | ec | c2 | 38 | 7b | 56 | f1 | 23 | e2 | 80 | 3b | ce | 53 | 7c | 21 | fe |
| a0 | 33 | 78 | fc | eb | 1a | af | ba | d1 | f3 | e5 | 30 | 7f | b1 | dc | 1b | a5 |
| b0 | dd | ac | 34 | f9 | 6a | 4d | c4 | 2a | f6 | 37 | a6 | d0 | 28 | c8 | 49 | 6c |
| c0 | 77 | 46 | 92 | 39 | b6 | 2b | 85 | d7 | bd | 29 | 8d | da | 70 | 42 | 9b | 3a |
| d0 | bb | a7 | 58 | 2c | 14 | d8 | 84 | c7 | d5 | 15 | cb | 8c | ad | b0 | 2e | 5d |
| e0 | 44 | 24 | 98 | 81 | f2 | a9 | e8 | 13 | e6 | 12 | fd | a3 | 91 | 89 | 40 | 26 |
| f0 | 22 | 96 | e4 | a8 | 63 | 5f | b8 | 36 | 35 | b3 | 5a | 65 | a2 | ea | 9f | 20 |

ALTERNATE GALOIS FIELD ADVANCED ENCRYPTION STANDARD ROUND

FIELD OF THE INVENTION

The present invention relates to cryptography generally and, more particularly, to a method and/or apparatus for implementing an alternate Galois Field Advanced Encryption Standard round.

BACKGROUND OF THE INVENTION

Advanced Encryption Standard (AES) is a cipher defined by the National Institute of Standards and Technology (NIST) in the Federal Information Processing Standard (FIPS) publication 197. The AES document defines a calculation called an "AES Round" that operates on a block of 128 bits, repeated ten, twelve or fourteen times. Performance criteria and the volume of data encrypted with AES have led to the development of dedicated electronic circuits for the AES Round computations.

The AES Round computations have two different versions, one version for encryption and another version for decryption. A variety of existing designs for AES round circuits can be classified as four basic types. Some circuits implement encryption only, some circuits implement decryption only, some circuits use separate subcircuits for the two operations, and some circuits use shared components that implement both operations.

For applications implementing both encryption and decryption, a design with separate subcircuits is fastest. However, a disadvantage of the separate subcircuits is that such designs are large and expensive. A design that uses the same components for both encryption and decryption is smaller and cheaper. The AES specification provides alternating linear and nonlinear transformations. A linear transformation is a matrix multiplication operation in boolean algebra that is commonly computed with a network of exclusive-OR (XOR) gates.

The linear transformation used in decryption is the inverse of the linear transformation used in encryption. A matrix for decryption is found by inverting the corresponding matrix for encryption, resulting in a completely different matrix. Thus, a completely different XOR network is implemented for decryption. Little opportunity exists to save area by using the same XOR gates for both the encryption and the decryption. In contrast, the nonlinear transformation is an inversion in 256-element Galois Field algebra, analogous to the function (1/X) in normal arithmetic. Therefore, the nonlinear transformation is an inverse of itself, since 1/(1/X)=X. Hence, the nonlinear transformation to be computed is the same in both the encryption and the decryption. As such, the components used for computing the nonlinear transformation are suitable for both encryption and decryption. As the area of a circuit that calculates the nonlinear transformation is typically larger than the area of a circuit that calculates the linear transformations, such reuse results in substantial area savings. However, a disadvantage of the conventional reuse approaches is that various details of the sequence of operations in the AES document are obstacles to making such a design run fast.

SUMMARY OF THE INVENTION

The present invention concerns an apparatus having a first circuit and a second circuit. The first circuit may be configured to (i) generate a second plurality of Galois Field elements by performing a first Galois Field inversion on a first plurality of Galois Field elements, the first Galois Field inversion being different from a second Galois Field inversion defined by an Advanced Encryption Standard and (ii) generate a third plurality of Galois Field elements by multiplying the second Galois Field elements by an inverse of a first predetermined matrix. The second circuit may be configured to (i) generate a fourth plurality of Galois Field elements by processing the third Galois Field elements in a current encryption round while in a non-skip mode, (ii) generate a fifth plurality of Galois Field elements by multiplying the fourth Galois Field elements by the first predetermined matrix and (iii) present the fifth Galois Field elements as updated versions of the first Galois Field elements in advance of a next encryption round.

The objects, features and advantages of the present invention include providing a method and/or apparatus for implementing an alternate Galois Field Advanced Encryption Standard round that may (i) utilize shared components in both the encryption and decryption, (ii) reorder the AES sequence to enable combining sequential operations, (iii) provide a circuit design that is smaller than conventional separate-subcircuit designs and/or (iv) operate faster than conventional shared-component designs of comparable area.

BRIEF DESCRIPTION OF THE DRAWINGS

These and other objects, features and advantages of the present invention will be apparent from the following detailed description and the appended claims and drawings in which:

FIG. 1 is a set of matrices used in a cipher;
FIG. 2 is a table to invert Galois Field elements.

DETAILED DESCRIPTION OF THE PREFERRED EMBODIMENTS

Figure 3:
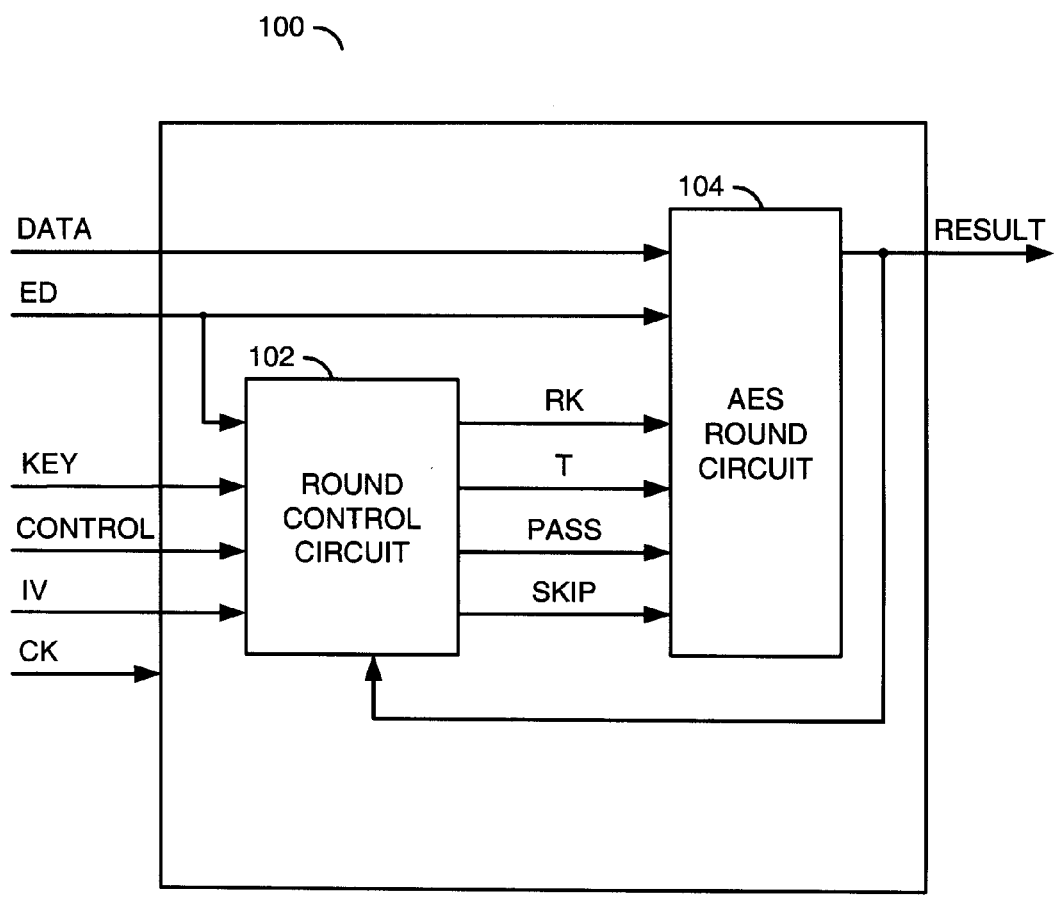
FIG. 3 is a block diagram of an example implementation of a system.

The Advanced Encryption Standard (AES), Federal Information Processing Standard (FIPS) publication 197, defined by the National Institute of Standards and Technology (NIST), generally defines cycles of operations for encryption and decryption. The AES FIPS publication 197 is hereby incorporated by reference in its entirety. A two-dimensional array of bytes defining intermediate cipher results may be referred to as a "State". An encryption cycle (or round) N is generally defined as the following sequence of operations:

```
...
//Start round N//
    8-bit Galois Field inversion          ("SubBytes")
    8-bit matrix multiplication by A      ("SubBytes" continued)
    Reorder bytes                         ("ShiftRows")
    32-bit matrix multiplication by M     ("MixColumns")
    XOR State with the round key          ("AddRoundKey")
//Start round N+1//
    8-bit Galois Field inversion          ("SubBytes")
    etc...
```

A cycle (or round) N of operations for a decryption is generally defined by the following sequence:

```
...
//Start round N//
    8-bit Galois Field inversion          ("InvSubBytes")
    XOR State with the round key          ("AddRoundKey")
    32-bit matrix multiplication by 1/M   ("InvMixColumns")
    Reorder bytes                         ("InvShiftRows")
    8-bit matrix multiplication by 1/A    ("InvSubBytes")
//Start round N+1//
    8-bit Galois Field inversion          ("InvSubBytes" continued)
    etc . . .
```

The matrix A may be described in FIPS 197 by equation 5.2, as shown in FIG. 1. The matrix M may be described in FIPS 197 by equation 5.6, as shown in FIG. 1. A basic cycle (or round) N of operations for an AES round circuit that reuses a Galois Field inversion may be defined as follows:

```
...
//Start round N//
    8-bit Galois Field inversion
    if encrypting
        8-bit matrix multiplication by A
        Reorder bytes
        32-bit matrix multiplication by M
        XOR State with the round key
    else (decrypting)
        XOR State with the round key
        32-bit matrix multiplication by 1/M
        Reorder bytes
        8-bit matrix multiplication by 1/A
//Start round N+1//
    8-bit Galois Field inversion
    etc . . .
```

The basic sequence may be altered in several details to simplify the computations. First, the Galois Field (GF) defined by FIPS 197 may be replaced by an alternative Galois Field. Before the GF inversion, the input data (e.g., GF elements) to the Galois Field inversion may be multiplied by a matrix D, shown in FIG. 1. After the GF inversion, the output data may be multiplied by an inverse (e.g., 1/D) of the matrix D. The matrix D generally has the effect of translating the Galois Field inversion problem from the Galois Field specified in FIPS 197 to an inversion problem for the alternate Galois Field. The alternate Galois Field generally makes the GF inversion operations simpler than as specified in FIPS 197.

The alternative GF inversion is generally defined as the unique GF element that yields 1 when multiplied by a given element in the alternative GF. A composite field GF $((2^2)^2)^2$, with irreducible polynomials $x^2+x+1$, $x^2+x+\{10\}$, and $x^2+x+\{1100\}$ may be used. Since nothing may be multiplied by 0 to give 1, inversion of 0 may be taken to be 0.

Referring to FIG. 2, a TABLE I to invert the GF elements is shown. A sum of a particular hexadecimal digit in the top heading and another hexadecimal digit in the left heading may be used to define an input element. The resulting inverted element may be taken as a pair of hexadecimal digits (2 digits) at the intersection of the particular row and column that define the input element. For example, an input element of "1f" may be represented by "10" in the left column and "f" in the top row (e.g., 10+f=1f). Therefore, alt_GF_inv(1f)=8a, which in decimal generally means alt_GF_inv(31)=138.

Inverting elements of the GF(256) may be accomplished using algebraic transformations of solutions to the reduced problem of inversion in GF(16). An example deconstruction of the GF(256) may be found in the paper "High-speed VLSI architectures for the AES algorithm" by Zhang and Parhi, IEEE Transactions on VLSI Systems, vol. 12, no. 9, 2004, which is hereby incorporated by reference in its entirety. The alternative GF inversion in the GF(16) may be implemented as follows:

input x, y, z, t; //each a 1-bit object//
output X, Y, Z, T; //each a 1-bit object//
f0033=x & z;
f00aa=x & ~t;
f0a0a=y & ~t;
f33ff=x|z;
f5050=~y & t;
f0050=x & f5050;
f0a3b=f0033|f0a0a;
f0f0c=~f0033 & y;
f23af=f33ff & ~f5050;
f5a5a=f0a0a|f5050;
f00a2=f00aa & ~f0f0c;
f0810=f0a3b & ~f23af;
f0f04=~f00aa & f0f0c;
f0f5f=f0050|y;
f2300=~x & f23af;
f31c4=~f0a3b & f33ff;
f4a1a=~f31c4 & f5a5a;
Y=f0f5f & ~f2300;
X=f00a2|f0f04;
Z=f0810|f31c4; and
T=f2300|f4a1a, where "&" generally represents a logical AND, "|" a logical OR and "~" a logical NOT. The above functions may be implemented as Application Specific Integrated Circuit gates, Field Programmable Gate Array slices or the like.

The multiplication by the matrix D may be moved into the linear section of the sequence of operations, resulting in the following sequence:

```
...
//Start round N//
    8-bit Alternate Galois Field inversion
    8-bit matrix multiplication by 1/D
    if encrypting
        8-bit matrix multiplication by A
        Reorder bytes
        32-bit matrix multiplication by M
        XOR state with the round key
        8-bit matrix multiplication by D
    else (decrypting)
        XOR state with the round key
        32-bit matrix multiplication by 1/M
        Reorder bytes
        8-bit matrix multiplication by 1/A
        8-bit matrix multiplication by D
//Start round N+1//
    8-bit Alternate Galois Field inversion
    8-bit matrix multiplication by 1/D
    etc . . .
```

Matrix multiplication is generally associative, therefore D*(1/A*X) is the same as (D*1/A)*X. Since the matrix D and the matrix 1/A are constant matrices, a circuit designer may multiply the matrix D by the matrix 1/A prior to the layout of a circuit implementing the above sequence. Therefore, the circuit may implement a single multiplication (e.g., multiply by D*1/A) instead of two multiplications (e.g., multiply by 1/A then multiply by D). The sequence of operations may be refined as follows:

```
//Start round N//
    8-bit Alternate Galois Field inversion
    8-bit matrix multiplication by 1/D
    if encrypting
        8-bit matrix multiplication by A
        Reorder bytes
        32-bit matrix multiplication by M
        XOR state with the round key
        8-bit matrix multiplication by D
    else (decrypting)
        XOR state with the round key
        32-bit matrix multiplication by 1/M
        Reorder bytes
        8-bit matrix multiplication by D*1/A
//Start round N+1//
    8-bit Alternate Galois Field inversion
    8-bit matrix multiplication by 1/D
    etc . . .
```

Another change in the cycle of operations generally takes advantage of the fact that 8-bit matrix multiplication and byte reordering are commutative operations. Therefore, byte reordering may be performed at the beginning of the encryption path instead of in the middle. The resulting sequence of operations may be as follows:

```
//Start round N//
    8-bit Alternate Galois Field inversion
    8-bit matrix multiplication by 1/D
    if encrypting
        Reorder bytes
        8-bit matrix multiplication by A
        32-bit matrix multiplication by M
        XOR state with the round key
        8-bit matrix multiplication by D
    else (decrypting)
        XOR state with the round key
        32-bit matrix multiplication by 1/M
        Reorder bytes
        8-bit matrix multiplication by D*1/A
//Start round N+1//
    8-bit Alternate Galois Field inversion
    8-bit matrix multiplication by 1/D
    etc . . .
```

The above sequence generally brings the 8-bit matrix multiplication by A together with the 32-bit matrix multiplication by M. However, multiplying the matrix M directly by the matrix A may result in a complicated 32-bit matrix. Therefore, the matrix M may be broken into several (e.g., 3) matrices. The 32-bit linear transformation may be represented by summing three 8-bit matrices (e.g., H[0:2]) multiplied by different bytes of the State in groups of four. Summing the resulting matrices is generally a 2-XOR-deep operation. The matrices H0, H1 and H2 are generally shown in FIG. 1.

The 8-bit matrices H0, H1 and H2 may each be multiplied by the matrix A, just as the matrix D was multiplied by the matrix 1/A, allowing two multiplications to be performed in a single operation. Thus, the cycle of operations may be adjusted as follows:

```
//Start round N//
    8-bit Alternate Galois Field inversion
    8-bit matrix multiplication by 1/D
    if encrypting
        Reorder bytes
        8-bit matrix multiplication by H[0:2]*A
        XOR groups of four
        XOR State with the round key
        8-bit matrix multiplication by D
    else (decrypting)
        XOR State with the round key
        32-bit matrix multiplication by 1/M
        Reorder bytes
        8-bit matrix multiplication by D*1/A
//Start round N+1//
    8-bit Alternate Galois Field inversion
    8-bit matrix multiplication by 1/D
    etc . . .
```

The parallel multiplications by the matrix H0*A, the matrix H1*A and the matrix H2*A generally frees up time along the encryption path to negate the time consumed through the extra multiplication by the matrix D. Thus, the design price for using the easier-to-compute alternate Galois Field is effectively a single 8-bit matrix multiplication rather than two 8-bit matrix multiplications.

The technique of breaking up M into smaller matrices may also be applied to the matrix 1/M. In particular, several (e.g., 4) 8-bit matrices (e.g., G[0:3] as shown in FIG. 1) may be implemented in place of the matrix 1/M. Although no second matrix is generally available to merge with the matrices G0, G1, G2 and G3, breaking up the matrix 1/M into four matrices may result in a physically smaller circuit design. As such, the cycle of operations may be expressed as follows:

```
//Start round N//
    8-bit Alternate Galois Field inversion
    8-bit matrix multiplication by 1/D
    if encrypting
        Reorder bytes
        8-bit matrix multiplication by H[0:2]*A
        XOR groups of four
        XOR State with the round key
        8-bit matrix multiplication by D
    else (decrypting)
        XOR State with the round key
        8-bit matrix multiplication by G[0:3]
        XOR groups of four
        Reorder bytes
        8-bit matrix multiplication by D*1/A
//Start round N+1//
    8-bit Alternate Galois Field inversion
    8-bit matrix multiplication by 1/D
    etc . . .
```

The number of AES Rounds in the AES document is variable and thus an additional modification may be made to the sequence of operations. Depending on a key size, an AES cipher generally runs for 10 rounds, 12 rounds, or 14 rounds. The varying number of rounds may be an inconvenience in the design of computing machinery that depends on the processed data arriving at a destination exactly when expected. As such, a "do nothing" round may be included in both the encryption sequence and the decryption sequence of operations such that the final results may always be available at the end of the fourteenth round. The do-nothing capability generally allows a circuit to be instructed to (i) encrypt or decrypt ten times and then pass the 128-bit block of data through unchanged four times and (ii) encrypt or decrypt twelve times and pass the block of data through unchanged twice. As such, the result may always be available after fourteen cycles, no matter how many active rounds the AES definition specifies. Therefore, the sequence of operations may be defined as follows:

```
...
//Start round N//
    8-bit Alternate Galois Field inversion
    8-bit matrix multiplication by 1/D
    if encrypting or do-nothing
      Reorder bytes
      8-bit matrix multiplication by H[0:2]*A
      XOR groups of four
      XOR State with the round key
      if do-nothing (encrypting or decrypting)
        replace data with output of last 1/D multiplication
      8-bit matrix multiplication by D
    else (active decrypting)
      XOR State with the round key
      8-bit matrix multiplication by G[0:3]
      XOR groups of four
      Reorder bytes
      8-bit matrix multiplication by D*1/A
//Start round N+1//
    8-bit Alternate Galois Field inversion
    8-bit matrix multiplication by 1/D
    etc . . .
```

Referring to FIG. 3, a block diagram of an example implementation of a system 100 is shown. The system (or apparatus) 100 may implement an alternate Galois Field AES round cipher. The system 100 generally comprises a circuit (or module) 102 and a circuit (or module) 104.

A signal (e.g., DATA) may be received by the circuit 104. The signal DATA may represent plaintext when the system 100 is in an encryption mode and ciphertext when the system 100 is in a decryption mode. The circuit 104 may present a signal (e.g., RESULT) to the circuit 102 and external to the system 100. The signal RESULT may represent ciphertext when the system 100 is in the encryption mode and plaintext when the system 100 is in the decryption mode.

A clock signal (e.g., CK) may be received by the system 100. The signal CK may be used by all of the circuits 102 and 104. A signal (e.g., ED) may be received by the circuit 102 and the circuit 104. The signal ED may be asserted (e.g., a logical 1 state) to command the decryption mode and deasserted (e.g., a logical 0 state) to command the encryption mode. A signal (e.g., KEY) may be received by the circuit 102. The signal KEY may convey a 128-bit, a 192-bit or a 256-bit cipher key. A signal (e.g., IV) may be received by the circuit 102. The signal IV may contain an initialization vector. A signal (e.g., CONTROL) may also be received by the circuit 102. The signal CONTROL may inform the circuit 100 when data is available, a key size, a mode of operation, when to start and the like.

The circuit 102 may generate and present a signal (e.g., RK) to the circuit 104. The signal RK may convey a sequence of round keys. A signal (e.g., T) may be generated by the circuit 102 and presented to the circuit 104. The signal T generally modifies the input data and the last round key. The circuit 102 may generate and present a signal (e.g., PASS) to the circuit 104. The signal PASS may be asserted (e.g., the logical 1 state) while new data is being received via the signal DATA and deasserted (e.g., the logical 0 state) when a block of data (e.g., State) is being processed in a round. The circuit 102 may generate a signal (e.g., SKIP) that is presented to the circuit 104. The signal SKIP may be asserted (e.g., the logical 1 state) during a transparent (e.g., do-nothing) mode and deasserted (e.g., the logical 0 state) during active encryption and active decryption.

The circuit 102 generally implements a round control circuit. The circuit 102 may be operational to generate the signal RK, the signal T based on the signal KEY and the signal CK. Generation of the signal RK may be defined in the FIPS 197 section 5.2 Key Expansion, where the signal RK conveys the key schedule of 4-byte words, denoted by w [i]. The optional signal T generally conveys preprocessing and/or postprocessing data. An initial value of the signal T may be used to modify the input data. A last (or end) value of the signal T may be used to modify the last round key.

The circuit 104 may implement an AES round circuit. The circuit 104 is generally operational to (i) insert data into the cipher, (ii) conduct multiple rounds of the cipher and (iii) extract data from the cipher. The cipher may perform an encryption in a first mode and a decryption in a second mode.

Figure 4:
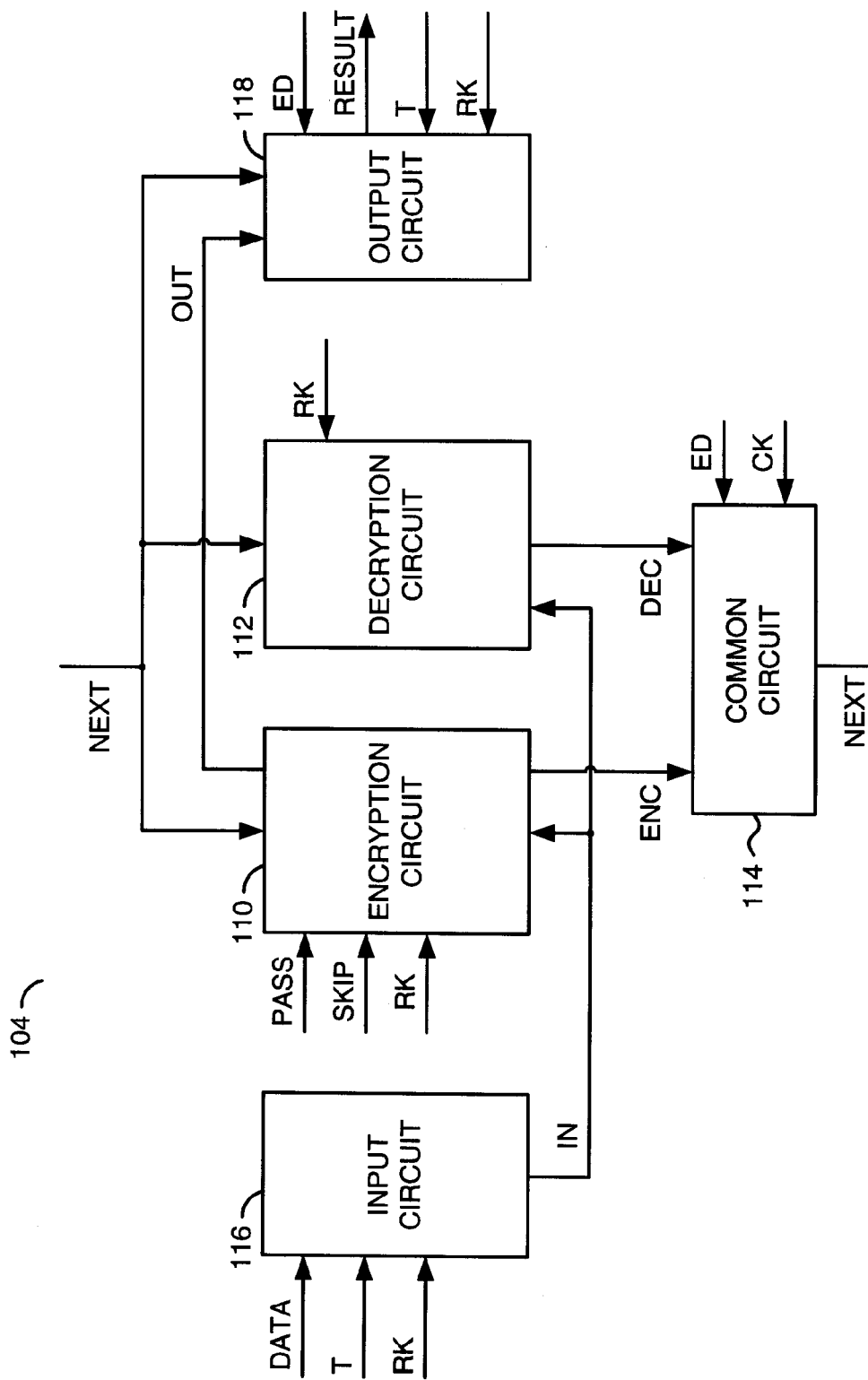
FIG. 4 is a block diagram of an example implementation of a round circuit in accordance with a preferred embodiment of the present invention.

Referring to FIG. 4, a block diagram of an example implementation of the circuit 104 is shown in accordance with a preferred embodiment of the present invention. The circuit 104 generally comprises a circuit (or module) 110, a circuit (or module) 112, a circuit (or module) 114, a circuit (or module) 116 and a circuit (or module) 118.

The circuit 110 may receive a signal (e.g., NEXT) from the circuit 114, a signal (e.g., IN) from the circuit 116, the signal RK, the signal PASS and the signal SKIP. The circuit 110 may generate and present a signal (e.g., ENC) to the circuit 114. A signal (e.g., OUT) may be generated by the circuit 110 and presented to the circuit 118.

The circuit 112 may receive the signal NEXT, the signal IN, the signal RK, the signal PASS and the signal SKIP. The circuit 112 may generate and present a signal (e.g., DEC) to the circuit 114.

The circuit 114 may receive the signal ENC, the signal DEC, the signal ED and the signal CK. The signal NEXT may be generated by the circuit 114 and presented to the circuits 110, 112 and 118. The circuit 116 may receive the signal DATA, the signal T and the signal RK. The circuit 118 may receive the signal T, the signal RK, the signal ED, the signal OUT and the signal NEXT. The signal RESULT may be presented from the circuit 118 to external of the system 100.

The circuit 110 generally implements a first portion of an encryption round circuit. The circuit 110 may be operational to perform most of the linear operations unique to the encryption rounds. The operations may include, but are not limited to, shifting rows in intermediate data blocks (States), multiplying the States by predetermined matrices, combining the results of the multiplication by the predetermined matrices, XOR'ing the States with the round key, and multiplying the States by a given matrix.

The circuit 112 generally implements a first portion of a decryption round circuit. The circuit 112 may be operational to perform most of the linear operations unique to the decryption rounds. The operations may include, but are not limited to, XOR'ing the States with the round key, multiplying the States by predetermined matrices, combining the results of the predetermined matrices multiplications, inverse row shifting the States and multiplying the States by a given matrix.

The circuit 114 may implement a second (common) portion of both the encryption round circuit and the decryption round circuit. The circuit 114 may be operational to perform the alternate GF inversion and the matrix 1/D multiplication operations.

The circuit 116 may implement an input processing circuit. The circuit 116 is generally operational to perform initial operations on the input blocks received in the signal DATA. The input block may comprise plaintext data to be encrypted or ciphertext to be decrypted.

The circuit 118 generally implements an output processing circuit. The circuit 118 may be operational to perform final operations on the States calculated by the circuit 110 and the circuit 112 to generate the signal RESULT.

Figure 5:
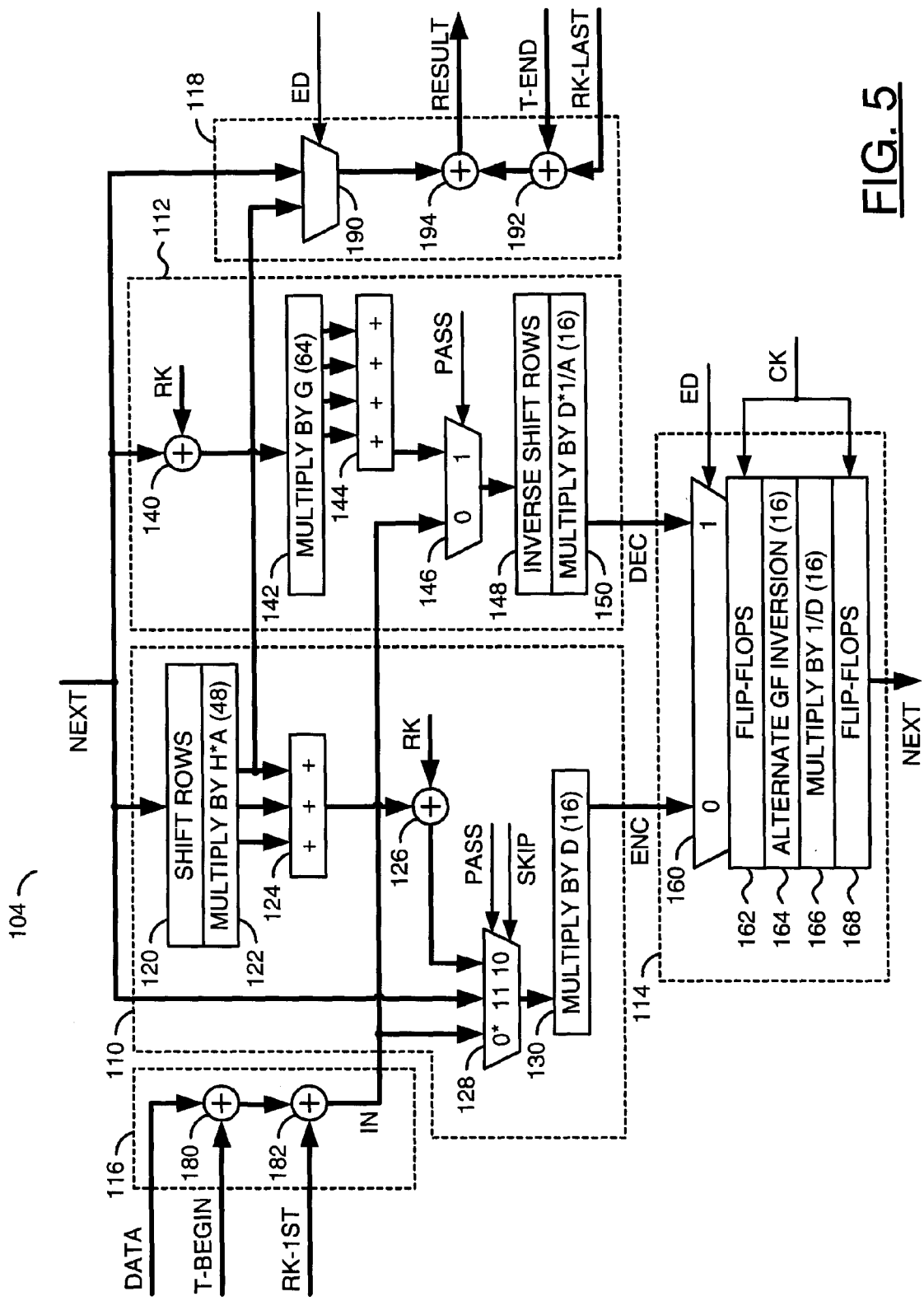
FIG. 5 is detailed block diagram of the example round circuit.

Referring to FIG. 5, a detailed block diagram of the example implementation of the circuit 104 is shown. The circuit 110 generally comprises a circuit (or module) 120, a circuit (or module) 122, a circuit (or module) 124, a circuit (or module) 126, a circuit (or module) 128 and a circuit (or module) 130. The circuit 112 generally comprises a circuit (or module) 140, a circuit (or module) 142, a circuit (or module) 144, a circuit (or module) 146, a circuit (or module) 148 and a circuit (or module) 150. The circuit 114 generally comprises a circuit (or module) 160, a circuit (or module) 162, a circuit (or module) 164 and a circuit (or module) 166. The circuit 116 generally comprises a circuit (or module) 180 and a circuit (or module) 182. The circuit 118 generally comprises a circuit (or module) 190, a circuit (or module) 192 and a circuit (or module) 194.

Generally, the thick lines connecting the various circuits in FIG. 5 may represent wide (e.g., 128-bit) busses. A number in parenthesis (e.g., (N)) generally indicates that N parallel 8-bit operations may be performed. The circuit 116 may be utilized to set up a first round. The circuit 118 is generally utilized during a last round.

A variety of designs may be utilized to implement the do-nothing option, a particular implementation being shown in FIG. 5. As illustrated, a replacement point (e.g., circuit 128) at which the last two rounds or four rounds are replaced by a previous block just multiplied by the matrix 1/D (e.g., circuit 166) is inside the encryption path. Locating the replacement point inside the encryption path generally avoids introducing further delays in the decryption path, which is typically the slower path. Furthermore, in a pipelined design with the nonlinear transformations performed in a separate clock cycle from the bulk of the matrix multiplications, the replacement point generally provides a mechanism to deactivate both the encryption cycle and the decryption cycle. Otherwise, a dedicated multiplexer and matrix D multiplication circuit may be introduced into the decryption path. However, by preserving the matrix D multiplication (e.g., the circuit 130) in the encryption path, the second matrix multiplier and the second multiplexer may be eliminated.

The nonlinear cycle operations generally carry out the normal functions and, in combination with the matrix D multiplication, form a complete Galois Field inversion. Since the nonlinear operation is mathematically an inverse of itself, performing two successive rounds, with all other linear transformations deactivated, may effectively result in a non-operation. Thus, the Galois Field inversions may cancel each other out in the successive rounds.

As noted previously, the overall AES calculations generally apply the AES Round operations ten to fourteen times. In some embodiments, the AES implementation may use the same AES round circuit (e.g., circuit 104) to perform every round of calculations. Some embodiments may contain ten to fourteen copies of an AES round circuit, where each of the AES round circuits performs a single round. In still other embodiments, an intermediate approach may be used, such as having a few (e.g., two) AES round circuits. For example, a first AES round circuit may perform the initial five, six or seven of the round calculations, and a second AES round circuit may perform the remaining five, six or seven round calculations. In another example, the first AES round circuit may used for the odd numbered rounds (e.g., 1, 3, 5, 7, 9, 11 and 13) and the second AES round circuit may be used for the even numbered rounds (e.g., 2, 4, 6, 8, 10, 12 and 14). An advantage of the second example may be that a single feedback path may be implemented from the output of the second AES round circuit back to the input of the first AES round circuit. In general, a design with N AES round circuits may work on N different encryptions or decryptions at the same time. Therefore, designs with more round circuits may support higher communication rates but are generally larger in terms of chip area.

In a design that uses the same round circuit more than once on each data block, the design may contain a feedback path to bring the output of some round calculations back to the input of the next round. An insertion point may also be provided to insert new data blocks into the first round. Furthermore, an extraction point may be provided to remove the data blocks. The insertion point and the extraction point may be implemented in a number of places in the circuit 104. As illustrated in FIG. 5, the insertion point may flow into the do-nothing path when encrypting and just ahead of byte-reordering when decrypting. For implementations with N round circuits, the additions may be implemented in a few (e.g., one or two) AES round circuits. The remaining N−1 AES round circuits may be implemented without an insertion point or an extraction point, as described previously. The cycle of operations for the AES round circuit with the insertion point may be as follows:

```
 . . .
//Start round N//
    8-bit Alternate Galois Field inversion
    8-bit matrix multiplication by 1/D
    if encrypting or do-nothing
      Reorder bytes
      8-bit matrix multiplication by H[0:2]*A
      XOR groups of four
      XOR State with the round key
      if inserting (First round) or do-nothing
        XOR the round key with external input to be encrypted
        replace data with results of XOR if inserting;
          otherwise replace data with output of the last
            1/D multiplication if do-nothing (encrypting or
            decrypting)
      8-bit matrix multiplication by D
    else (active decrypting)
      XOR State with the round key
      8-bit matrix multiplication by G[0:3]
      XOR groups of four
      if inserting (First round)
        XOR the round key with external input to be decrypted
        replace data with results of XOR
      Reorder bytes
      8-bit matrix multiplication by D*1/A
//Start round N+1//
    8-bit Alternate Galois Field inversion
    8-bit matrix multiplication by 1/D
    etc . . .
```

The overall AES calculation is generally a serial process involving hundreds of levels of logic gates, each depending on the previous level. An integrated circuit (die or chip) in which a non-pipelined AES implementation is embedded may therefore be clocked sufficiently slowly for the entire calculation to finish by the combinational propagation of signals. In some embodiments, the circuitry may be pipelined with registers (or flip-flops) included in the data path to store intermediate results from one clock cycle to the next. The registers may be added in sufficient numbers and optimal positions, depending on the clock period and on when various external control signals become available. As shown in FIG. 5, pipeline registers may be added before each alternate Galois Field inversion and after each matrix 1/D multiplication.

Figure 6A:
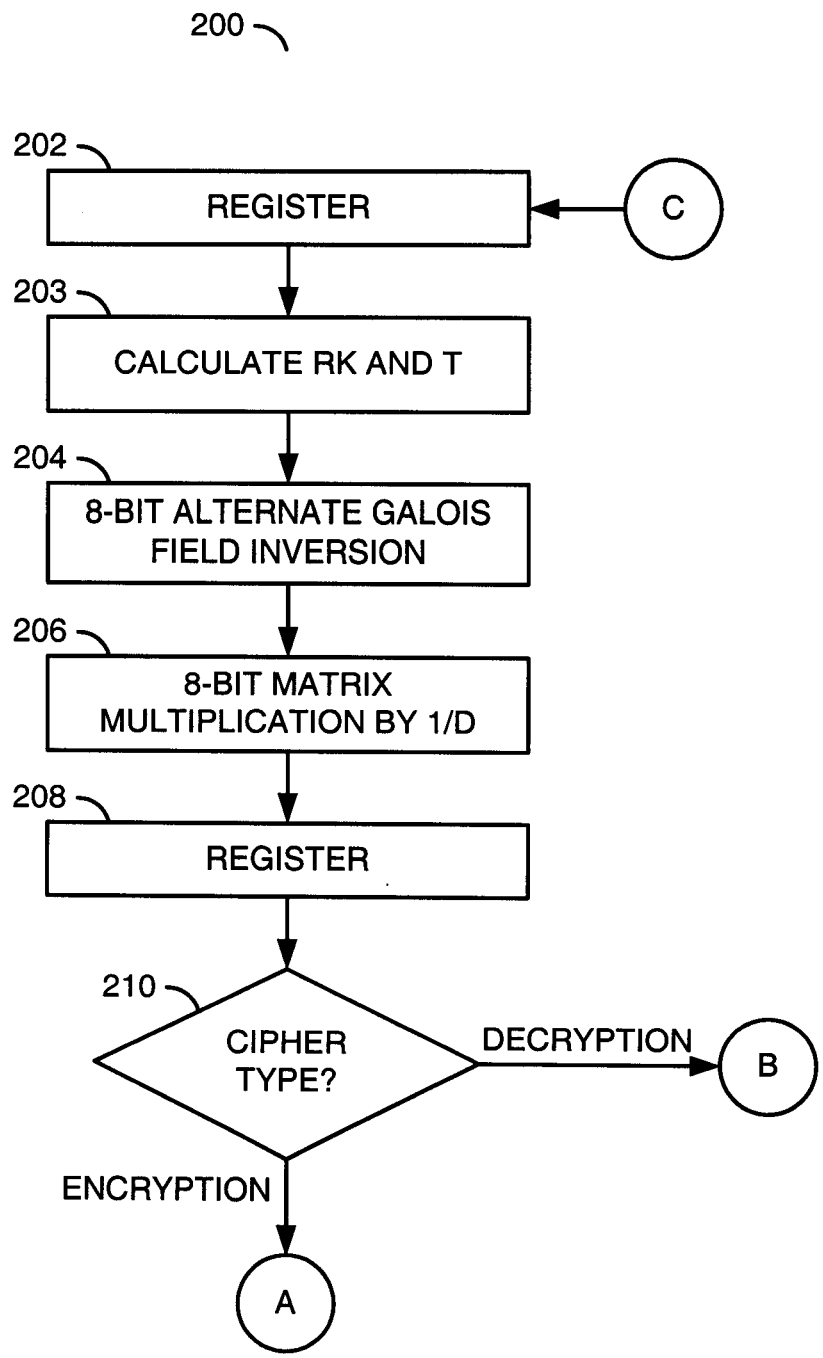
FIGS. 6A-C are a flow diagram of an example method of a round cycle.
Figure 6B:
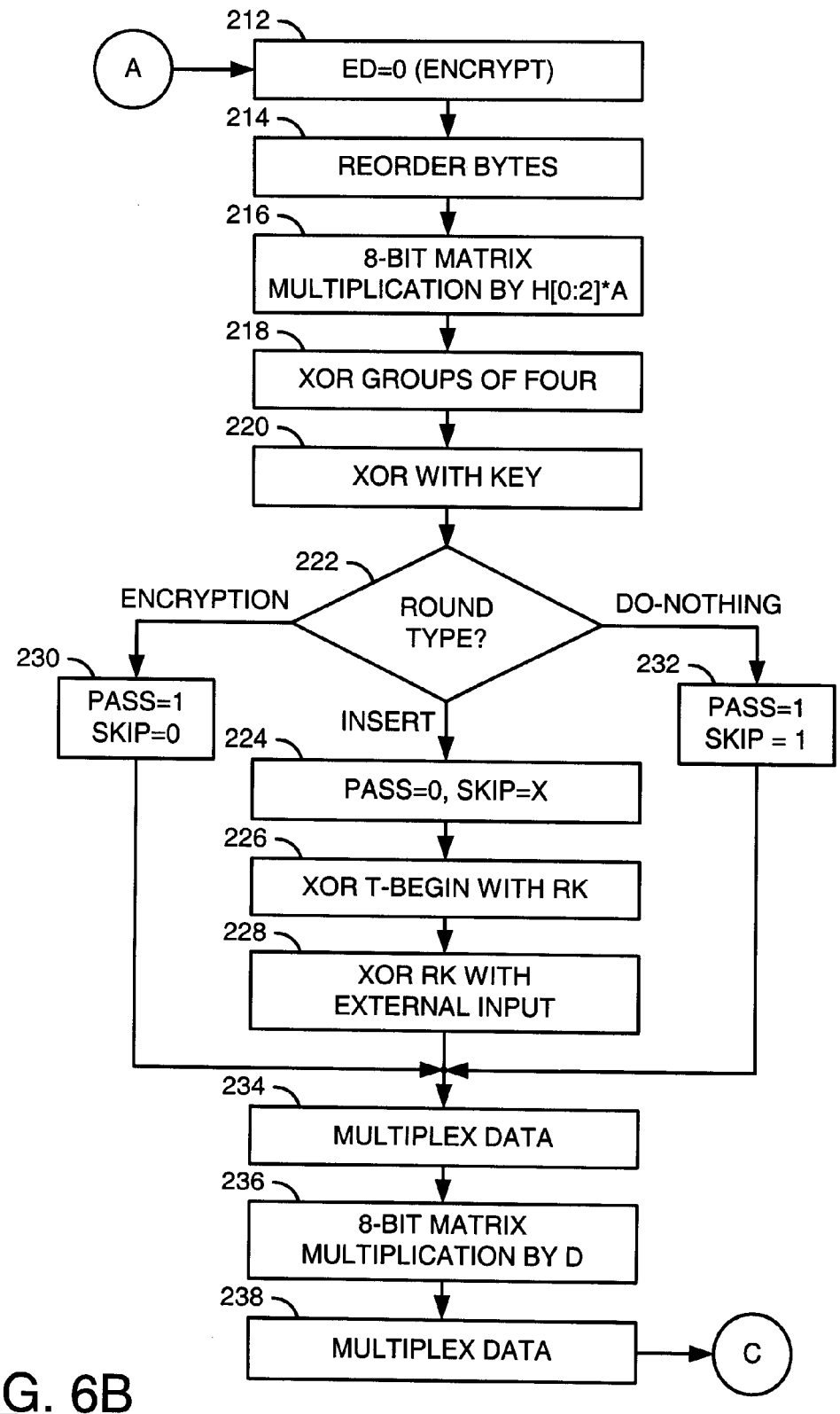
Figure 6C:
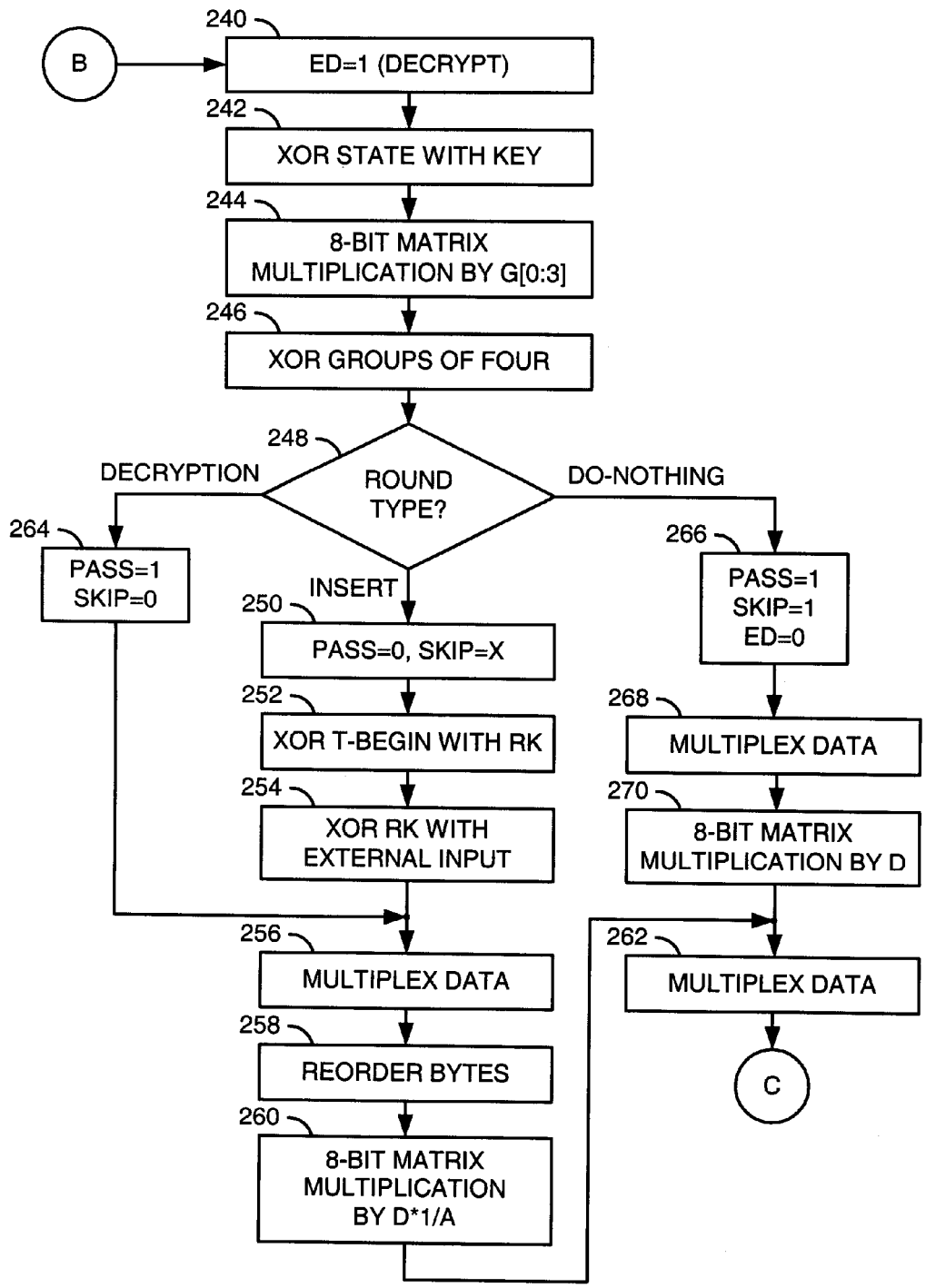

Referring to FIGS. 6a-6C a flow diagram of an example method 200 of a round cycle is shown. The method (or process) 200 may be implemented by the system 100. The method generally comprises a step (or block) 202, a step (or block) 203, a step (or block) 204, a step (or block) 206, a step (or block) 208, a step (or block) 210, a step (or block) 212, a step (or block) 214, a step (or block) 216, a step (or block) 218, a step (or block) 220, a step (or block) 222, a step (or block) 224, a step (or block) 226, a step (or block) 228, a step (or block) 230, a step (or block) 232, a step (or block) 234, a step (or block) 236, a step (or block) 238, a step (or block) 240, a step (or block) 242, a step (or block) 244, a step (or block) 246, a step (or block) 248, a step (or block) 250, a step (or block) 252, a step (or block) 254, a step (or block) 256, a step (or block) 258, a step (or block) 260, a step (or block) 262, a step (or block) 264, a step (or block) 266, a step (or block) 268 and a step (or block) 270.

Referring to FIG. 6A, a data block for the current round (e.g., round N) may be buffered in the register 162 in the step 202. The circuit 102 may generate a round key in the signal RK and a value in the signal T for the appropriate round in the step 203. The circuit 164 may perform an alternate Galois Field inversion on the data received from the register 162 in the step 204. In the step 206, the circuit 166 may multiply the data block by the matrix 1/D and buffer the results in the register 168 in the step 208. In the step 210, a cipher type may be examined by the circuit 102.

If the current cipher type is an encryption (e.g., the ENCRYPTION branch of block 210), the method 200 may continue along the encryption path through the circuit 110 in FIG. 6B. In the step 212, the circuit 102 may set the signal ED to 0 (e.g., encryption). The circuit 120 may reorder the bytes in the data block in the step 214. Parallel 8-bit multiplications by the matrices H[0:2]*A may be performed in the step 216 by the circuit 122. In the step 218, the circuit 124 may XOR groups of four from the matrix multiplications of the step 216. The resulting data block may be XOR'ed with the current round key in the step 220 by the circuit 126. Every GF element may be multiplied by all three of the matrices H0, H1 and H2.

In the step 222, the circuit 102 may examine the type of round being performed. If the current round is an insertion (e.g., the INSERTION branch of step 222), the circuit 102 may set the signal PASS to 0 (e.g., insert new data from the signal DATA) and the signal SKIP to don't care (e.g., 0 or 1) in the step 224. The circuit 180 may XOR the new data block with the signal T in the step 226. In the step 228, the circuit 182 may XOR the data block with the first round key (generated by the circuit 102).

If the current round type is an encryption (e.g., the ENCRYPTION branch of step 222), the circuit 102 may set the signal PASS to 1 (e.g., next data from the signal NEXT) and the signal SKIP to 0 (e.g., active round) in the step 230. If the current round type is do-nothing (e.g., the DO-NOTHING branch of step 222), the circuit 102 may set the signal PASS to 1 (e.g., next data from the signal NEXT) and the signal SKIP to 1 (e.g., a transparent round) in the step 232. The circuit 128 may be controlled by both the signal PASS and the signal SKIP to multiplex the appropriate data block for the current round type (e.g., from the block 182 for an insertion, from the block 126 while encrypting and from the block 168 while doing nothing) to the circuit 130 in the step 234. The circuit 130 may multiply the data block by the matrix D in the step 236. Thereafter, the circuit 160 may multiplex the data block back to the circuit 162 to end the current round in the step 238. The next round may begin with the data block of the current round being stored in the circuit 162 in the step 202.

Returning briefly to FIG. 6A, if the current cipher type is a decryption (e.g., the DECRYPTION branch of block 210), the method 200 may continue along the decryption path through the circuit 112 in FIG. 6C. In the step 240, the circuit 102 may set the signal ED to 1 (e.g., decryption). In the step 242, the data block received by the circuit 140 in the signal NEXT may be XOR'ed with the current round key from the signal RK. The circuit 142 may perform parallel 8-bit multiplications with the matrices G[0:3] in the step 244. The circuit 144 may XOR the results in groups of four in the step 246. Every GF element may be multiplied by all four of the matrices G0, G1, G2 and G3.

The circuit 102 may examine the current round type in the step 248. If new data is being inserted into the first round (e.g., the INSERT branch of step 248), the circuit 102 may set the signal PASS to 0 (e.g., new data block from the signal DATA) and the signal SKIP to don't care in the step 250. In the step 252, the circuit 180 may XOR the new data block with the signal T and present the results to the circuit 182. The circuit 182 may XOR the data block with the first round key from the signal RK in the step 254. In the step 256, the circuit 146 may multiplex the new data block to the circuit 148 under control of the signal PASS. In the step 258, the circuit 148 may reorder the bytes in the data block and present the results to the circuit 150. The circuit 150 may perform parallel 8-bit matrix multiplications by the matrix D*1/A in the step 260. In the step 262, the circuit 160 may multiplex the data from the circuit 150 to the circuit 162 to set up the first round.

If the current round type is a decryption (e.g., the DECRYPTION branch of step 248), the circuit 102 may set the signal PASS to 1 (e.g., next data from the signal NEXT) and the signal SKIP to 0 (or 1) in the step 264. In the step 256, the circuit 146 may multiplex the data block to the circuit 148 under control of the signal PASS. In the step 258, the circuit 148 may reorder the bytes in the data block and present the results to the circuit 150. The circuit 150 may perform parallel 8-bit matrix multiplications by the matrix D*1/A in the step 260. In the step 262, the circuit 160 may multiplex the data from the circuit 150 to the circuit 162 to complete the current round.

If the current round type is do-nothing (e.g., the DO-NOTHING branch of the step 248), the circuit 102 may set the signal PASS to 1 (e.g., next data from the signal NEXT), the signal SKIP to 1 (e.g., a transparent round) and switch the signal ED to 0 (e.g., use the do-nothing path through the encryption circuit 110) in the step 266. The circuit 128 may be controlled by both the signal PASS and the signal SKIP to multiplex the data block for the current round type from the circuit 114 to the circuit 130 in the step 268. The circuit 130 may multiply the data block by the matrix D in the step 270. Thereafter, the circuit 160 may multiplex the data block back to the circuit 162 to end the current round in the step 262. The next round may begin with the data block of the current round being stored in the circuit 162 in the step 202.

The complete AES calculation generally includes some additional steps after all of the AES Round computations are finished. The last round key may be XOR'ed with the last value in the signal T by the circuit 192. The last results from the AES rounds may be XOR'ed with a last round key by the circuit 194 using the modified last round key received from the circuit 192. The results from the AES round circuit may be extracted at two points by the circuit 190. The circuit 190 may be controlled by the signal ED. If encrypting, the results may be multiplexed from the 8-bit matrix multiplication by H[0]*A (e.g., an output of the circuit 122) to the circuit 194. If decrypting, the results may be multiplexed from the 8-bit matrix multiplication by 1/D (e.g., an output of the circuit 166 as buffered in the circuit 168) to the circuit 194. The circuit 194 may present the final results (e.g., plaintext or ciphertext) in the signal RESULT. In some embodiments, both of the extraction points may also be outputs of the circuit 104. As such, the circuits 190, 192 and 194 may be implemented external to the circuit 104 to compute the final ciphertext or plaintext.

Different numbers of registers may be added at different locations within the circuit 104 to form different levels of pipelining under the present invention. Furthermore, one or both of the registers (e.g., the circuits 162 and/or 168) may be removed from the circuit 104. For example, a single register (e.g., circuit 162) may be implemented, resulting in a single-clock-cycle AES Round. In another example, three registers may be implemented giving a three-clock-cycle AES Round. In a case where three registers are added to each pair of AES round circuits, the 14 rounds may be completed in 21 clock cycles. In a case where two registers are added to a design with three AES round circuits (e.g., a single register between adjoining AES round circuits), the 14 rounds may be completed in 10 clock cycles. Other configurations of registers and round circuits may be implemented to meet the criteria of a particular application. The criteria may depend on, but are not limited to, the circuit throughput, capabilities of the manufacturing process, available chip area, and so forth.

The multiplication by 1/D after the alternate Galois Field inversion may also be moved into the linear section of the design similar to the movement of the multiplication by D. Thus, the multiplication by 1/D may be merged into the multiplication by H*A to create a single transformation.

If the round key material is available early enough from the circuit 102, the round key may be preprocessed during decryption by multiplying the round key by G[0:3]. As such, the sequence:

XOR state with the round key
8-bit matrix multiplication by G[0:3]

may be replaced by:

8-bit matrix multiplication by G[0:3]
XOR state with (G[0:3]*round key)

The latter sequence is generally calculated more quickly.

In some embodiments, the external data inserted into the decryption path may be inserted into the do-nothing path instead of through the multiplexor 146. Inserting through the do-nothing path generally shortens the decryption path delay because the circuit 146 delay may be removed from the path. However, the circuits 148 and 150 may be duplicated in the do-nothing path. The above change generally makes the circuit 104 faster at the expense of an increased size.

The AES round circuits may receive additional inputs and generate additional outputs by adding XOR gates and multiplexer cells to the insertion point and the extraction point. The additional input interfaces and output interfaces may be useful for implementing extensions to the basic AES technique, including block cipher modes such as Cipher-Block Chaining (CBC) and Liskov, Rivest, Wagner (LRW). Such additions may be incorporated into AES round circuitry or added externally. For example, the signal T may be presented to the circuit 104 to enable preprocessing and/or postprocessing of the data before/after the data passes through the AES cipher.

Several of the above alterations to the operation sequence of an AES round circuit that reuses the Galois Field inverter may also be applied to circuits that compute the inversion in the standard Galois Field, instead of inverting in the above alternate Galois Field. Using such alterations generally offers designers additional possible tradeoffs between performance and area.

The present invention generally merges several operations of an AES Round to achieve faster and simpler implementations. For example, the GF translation matrix may be merged with the matrix from the InvSubBytes chapter, 5.3.2 of FIPS 197. In another example, the matrix from SubBytes chapter, 5.1.1 of FIPS 197, may be merged with matrices forming the initial phase of MixColumns chapter, 5.1.3 of FIPS 197. In still another example, the GF inverse translation matrix may be merged with the matrices from SubBytes chapter and the MixColumns chapter.

The present invention may also implement a transparent mode (e.g., do-nothing mode) without bypassing the alternative Galois Field inversion. As such, even numbers of passes through the circuit 104 generally cause no change in the data blocks. In another example, the present invention may include preprocessing the round key with the matrices forming the initial phase of the InvMixColumns operation. Generally, the present invention may provide new tradeoffs between computational speed and circuit area.

The functions performed by the diagrams of FIGS. 1-6C may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMS, RAMS, EPROMs, EEPROMS, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the scope of the invention.

The invention claimed is:

1. An apparatus comprising:

a first circuit configured to (i) generate a second plurality of Galois Field elements by performing a first Galois Field inversion on a first plurality of Galois Field elements, said first Galois Field inversion being different from a second Galois Field inversion defined by an Advanced Encryption Standard and (ii) generate a third plurality of Galois Field elements by multiplying said second Galois Field elements by an inverse of a first predetermined matrix; and a second circuit configured to (i) generate a fourth plurality of Galois Field elements by processing said third Galois Field elements in a current encryption round while in a non-skip mode, (ii) generate a fifth plurality of Galois Field elements by multiplying said fourth Galois Field elements by said first predetermined matrix and (iii) present said fifth Galois Field elements as updated versions of said first Galois Field elements in advance of a next encryption round.

2. The apparatus according to claim 1, wherein said second circuit is further configured to present said third Galois Field elements as said fourth Galois Field elements while in a skip mode.

3. The apparatus according to claim 1, wherein said second circuit is further configured to (i) generate a sixth plurality of Galois Field elements by shifting said third Galois Field elements and (ii) generate a seventh plurality of Galois Field elements by multiplying said sixth Galois Field elements by a plurality of second predetermined matrices.

4. The apparatus according to claim 1, further comprising a third circuit configured to (i) generate a sixth plurality of Galois Field elements by processing said third Galois Field elements in a current decryption round, (ii) generate a seventh plurality of Galois Field elements by multiplying said sixth Galois Field elements by both said first predetermined matrix and a second predetermined matrix and (iii) present said seventh Galois Field elements as updated versions of said first Galois Field elements in advance of a next decryption round.

5. The apparatus according to claim 3, wherein said second circuit is further configured to (i) generate an eighth plurality of Galois Field elements by exclusive OR'ing said seventh Galois Field elements and (ii) generating said fourth Galois Field elements by exclusive OR'ing said eighth Galois Field elements with a round key.

6. A method of encryption, comprising the steps of:
(A) generating a second plurality of Galois Field elements by performing a first Galois Field inversion on a first plurality of Galois Field elements, said first Galois Field inversion being different from a second Galois Field inversion defined by an Advanced Encryption Standard;
(B) generating a third plurality of Galois Field elements by multiplying said second Galois Field elements by an inverse of a first predetermined matrix;
(C) generating a fourth plurality of Galois Field elements by processing said third Galois Field elements in a current encryption round while in a non-skip mode; and
(D) generating a fifth plurality of Galois Field elements by multiplying said fourth Galois Field elements by said first predetermined matrix.

7. The method according to claim 6, further comprising the step of:
presenting said third Galois Field elements as said fourth Galois Field elements while in a skip mode.

8. The method according to claim 6, further comprising the steps of:
generating a sixth plurality of Galois Field elements by shifting said third Galois Field elements; and
generating a seventh plurality of Galois Field elements by multiplying said sixth Galois Field elements by a plurality of second predetermined matrices.

9. The method according to claim 6, wherein said first Galois Field inversion comprises a Galois Field (16) inversion having (i) a plurality of input bits x, y, z, and t, (ii) a plurality of output bits X, Y, Z and T and (iii) the functions of:
F01=x AND z;
F02=x AND (NOT t);
F03=y AND (NOT t);
F04=x OR z;
F05=(NOT y) AND t;
F06=x AND F05;
F07=F01 OR F03;
F08=(NOT F01) AND y;
F09=F04 AND (NOT F05);
F10=F03 OR F05;
F11=F02 AND (NOT F08);
F12=F07 AND (NOT F09);
F13=(NOT F02) AND F08;
F14=F06 OR y;
F15=(NOT x) AND F09;
F16=(NOT F07) AND F04;
F17=(NOT F16) AND F10;
Y=F14 AND (NOT F15);
X=F11 OR F13;
Z=F12 OR F16; and
T=F15 OR F17.

10. The method according to claim 8, further comprising the steps of:
generating an eighth plurality of Galois Field elements by exclusive OR'ing said seventh Galois Field elements; and
generating said fourth Galois Field elements by exclusive OR'ing said eighth Galois Field elements with a round key.

11. An apparatus comprising:
a first circuit configured to (i) generate a second plurality of Galois Field elements by performing a first Galois Field inversion on a first plurality of Galois Field elements, said first Galois Field inversion being different from a second Galois Field inversion defined by an Advanced Encryption Standard and (ii) generate a third plurality of Galois Field elements by multiplying said second Galois Field elements by an inverse of a first predetermined matrix; and
a second circuit configured to (i) generate a fourth plurality of Galois Field elements by processing said third Galois Field elements in a current decryption round and (ii) generate a fifth plurality of Galois Field elements by multiplying said fourth Galois Field elements by both said first predetermined matrix and a second predetermined matrix while in a non-skip mode.

12. The apparatus according to claim 11, further comprising a third circuit configured to generate said fifth Galois Field elements by multiplying said third Galois Field elements by said first predetermined matrix while in a skip mode.

13. The apparatus according to claim 11, wherein said second circuit is further configured to (i) generate a sixth plurality of Galois Field elements by exclusive OR'ing said third Galois Field elements with a round key and (ii) generate a seventh plurality of Galois Field elements by multiplying said sixth Galois Field elements by a plurality of third predetermined matrices.

14. The apparatus according to claim 13, wherein said second circuit is further configured to generate an eighth plurality of Galois Field elements by exclusive OR'ing said seventh Galois Field elements.

15. The apparatus according to claim 14, wherein said second circuit is further configured to generate said fourth Galois Field elements by inverse shifting said eighth Galois Field elements.

16. A method of decryption, comprising the steps of:
(A) generating a second plurality of Galois Field elements by performing a first Galois Field inversion on a first plurality of Galois Field elements, said first Galois Field inversion being different from a second Galois Field inversion defined by an Advanced Encryption Standard;
(B) generating a third plurality of Galois Field elements by multiplying said second Galois Field elements by an inverse of a first predetermined matrix;
(C) generating a fourth plurality of Galois Field elements by processing said third Galois Field elements in a current decryption round; and (D) generating a fifth plurality of Galois Field elements by multiplying said fourth Galois Field elements by both said first predetermined matrix and a second predetermined matrix while in a non-skip mode.

17. The method according to claim 16, further comprising the step of:
presenting said fifth Galois Field elements by multiplying said third Galois Field elements by said first predetermined matrix while in a skip mode.

18. The method according to claim 17, further comprising the steps of:
generating a sixth plurality of Galois Field elements by exclusive OR'ing said third Galois Field elements with a round key; and
generating a seventh plurality of Galois Field elements by multiplying said sixth Galois Field elements by a plurality of third predetermined matrices.

19. The method according to claim 18, further comprising the step of:
generating an eighth plurality of Galois Field elements by exclusive OR'ing said seventh Galois Field elements.

20. The method according to claim 19, further comprising the step of:
generating said fourth Galois Field elements by inverse shifting said eighth Galois Field elements.

* * * * *